Jan. 31, 1967 E. L. ERWIN 3,301,964

SYSTEM FOR RELEASING MAGNETIC LATCHING CROSSBAR SWITCHES IN WHICH HOLD MAGNETS ARE INTERCONNECTED OVER CROSSPOINT CONTACTS OF THE PRECEDING SWITCH

Filed Dec. 9, 1963 3 Sheets-Sheet 1

INVENTOR
E. L. ERWIN
BY
SE Hollander
ATTORNEY

Jan. 31, 1967 E. L. ERWIN 3,301,964

SYSTEM FOR RELEASING MAGNETIC LATCHING CROSSBAR SWITCHES IN WHICH HOLD MAGNETS ARE INTERCONNECTED OVER CROSSPOINT CONTACTS OF THE PRECEDING SWITCH

Filed Dec. 9, 1963 3 Sheets-Sheet 2

Jan. 31, 1967 E. L. ERWIN 3,301,964

SYSTEM FOR RELEASING MAGNETIC LATCHING CROSSBAR SWITCHES IN WHICH HOLD MAGNETS ARE INTERCONNECTED OVER CROSSPOINT CONTACTS OF THE PRECEDING SWITCH

Filed Dec. 9, 1963 3 Sheets-Sheet 3

United States Patent Office 3,301,964
Patented Jan. 31, 1967

3,301,964

SYSTEM FOR RELEASING MAGNETIC LATCHING CROSSBAR SWITCHES IN WHICH HOLD MAGNETS ARE INTERCONNECTED OVER CROSSPOINT CONTACTS OF THE PRECEDING SWITCH

Edson L. Erwin, Towaco, N.J., assignor, by mesne assignments, to Bell Telephone Laboratories, Incorporated, New York, N.Y., a corporation of New York
Filed Dec. 9, 1963, Ser. No. 328,990
10 Claims. (Cl. 179—25)

This invention relates to telephone switching circuits and more particularly to telephone switching circuits equipped with magnetic latching crossbar switches.

The utilization of coordinate-type or crossbar switches has found widespread acceptance in view of the advantageous characteristics of the switches including relatively maintenance-free operation, flexibility and speed.

Perhaps the most prevalent application of this type of switch is in the No. 5 crossbar telephone system which is described in Patent 2,585,904 of A. J. Busch of February 19, 1952. As described therein the basic crossbar switch includes a plurality of horizontal magnets and a plurality of vertical magnets. The operation of a particular horizontal or "select" magnet followed by the operation of a particular vertical or "hold" magnet results in the actuation of a particular crosspoint on the switch. Subsequently, the horizontal magnet may be released, in turn releasing the select bar actuated thereby in order that it be available to establish other connections. The hold magnet remains engaged, however, and must remain so for the duration of the connection. Upon the release of the hold magnet, the crosspoint contacts are released.

It is apparent, therefore, that the necessity for maintaining the hold magnet operated carries with it the requirement of a continuous power supply to the hold magnet winding. In view of the relatively large number of simultaneous connections which may be effected in a telephone office or private branch exchange (PBX), the drain on the central office power supply, since it is directly proportional to the number of operated hold magnets, is significant.

An arrangement for obviating this difficulty in order to relieve the necessity for continuous power supply to operate hold magnets is disclosed in an article entitled, "Magnetic Latching Crossbar Switches," in the Bell System Technical Journal, September 1960, page 1351.

While completely operative and useful for its intended purpose, certain difficulties are encountered in considering this type of magnetic latching crossbar switch for use in conventional crossbar switching systems. In part, the difficulties are derived from the circuitry employed in maintaining the hold magnets operated in conventional arrangements. This procedure comprises the application of a ground potential to the sleeve conductor of the connection, which ground potential is further extended serially through the sleeve crosspoint of each of the crossbar switches in the train. The hold magnet for each switch obtains its ground potential from the sleeve conductor from the preceding switch. The opposite side of the hold magnet in each instance is connected to negative battery. Thus, in over-all aspect, each of the hold magnets is connected in parallel between ground and negative battery but the ground condition at each hold magnet is delivered through the crosspoint contacts of the preceding switch as well as the crosspoint contacts of the associated switch.

Since magnetic latching crossbar switches include hold magnets which must be released by a pulse of current in a direction opposite to that required for operating the magnets, the difficulties which may ensue in crossbar switching are manifest. Thus, if it is assumed that a train of crossbar switches is to be released by the application of a reverse potential to the sleeve conductor, it is conceivable that the hold magnet of the first switch in the train may release earlier than the succeeding hold magnets. In doing so, the crosspoint contacts associated with the first hold magnet will interrupt the release current path to the succeeding hold magnets thereby preventing the release of those magnets. Under these conditions and in view of the magnetic latching quality of the succeeding hold magnets in the train, it is possible for service to be disrupted. For example, if the hold magnet associated with a particular subscriber line fails to release in view of the interruption of the release current path by a switch in the trunk link frame, the subscriber will be divorced from any electrical connection to common equipment in the office and will also be disconnected from his own line relay (at the off-normal contacts of the hold magnet unique thereto) preventing him from making another call. In short, under the assumed conditions, the customer will have a completely "dead" line—no dial tone and no sidetone.

It is therefore an object of this invention to provide magnetic latching crossbar switches arranged for positive release of each of the hold magnets in the train.

Still another object of this invention is to provide a magnetic latching crossbar switch wherein the switch may be released by a pulse of current opposite in polarity to the current utilized for operating the switch.

A further object of this invention is to provide for the defluxing of all of the hold magnets in a switching train prior to the release of any one of the hold magnets.

An additional object of this invention is to provide magnetic crossbar switching release facilities which are compatible with existing conventional crossbar switching release procedures.

These and other objects and features of the invention may be achieved in a specific illustrative embodiment in which magnetic latching crossbar switches are equipped with hold magnets having cores which are defluxed much faster than the time for physical or mechanical release of the crossbar switch contacts. For example, the core material may be of the type referred to in the above-identified article which is arranged to switch magnetic orientation within approximately fifteen milliseconds while the minimum contact release time is approximately twenty-five milliseconds. With the utilization of the modified type of hold magnet, it would be feasible to utilize the conventional arrangement for releasing the switch over the sleeve conductor. Ordinarily, when using "current-held" hold magnets, release was effected simply by opening the sleeve conductor path to ground and thereby removing the ground potential from one side of each of the hold magnets in the train.

With the use of the magnetic latching switch of the present invention, the sleeve conductor, instead of being opened, has a pulse of current applied in a direction opposite to that used for operating the magnet. The duration of the pulse is arranged to be sufficient in intensity and length to effect a magnetic reorientation of all of the hold magnet cores in the train prior to the release of any one of the crosspoint contacts with an appropriate safety margin. Since the pulse need illustratively be of fifteen millisecond length, it is possible to deflux all of the cores prior to the release of any of the crossbar contacts (in approximately twenty-five milliseconds). Since the defluxing is accomplished before any of the switches are released, the continuity of the sleeve conductor path through the crosspoints of the successive switches in the train remain uninterrupted thereby permitting a continuous release current flow through the train.

Subsequent to the defluxing of the cores, the hold magnet and vertical bar associated with the hold magnet of the various switches release in a random manner. Random release of the crossbar switches, of course, includes the possibility that one switch in the train will interrupt the sleeve conductor path leading to other succeeding hold magnets but this will not affect the release of the switches associated with those magnets since the release current has since discontinued.

In short, the crossbar switch hold magnet cores include material capable of responding promptly to the release current by defluxing. Since this condition is in effect "remembered" after the release current has been removed, the hold magnets associated with the cores will in turn release without the possibility of any single crosspoint opening prematurely and preventing the defluxing of another core.

It should be remembered in this respect that defluxing of the core is sought in lieu of opposite magnetic orientation since the vertical bar of the crossbar switch is relatively soft magnetically. Thus, if the cores were reoriented rather than defluxed, the hold bar might release as the flux passed through zero but would then reoperate and remain operated, thereby rendering it unusable for other calls.

These and other objects and features of the invention may be more readily comprehended from an examination of the following specification, appended claims and attached drawing in which:

*General description of operation*

Figure 1:
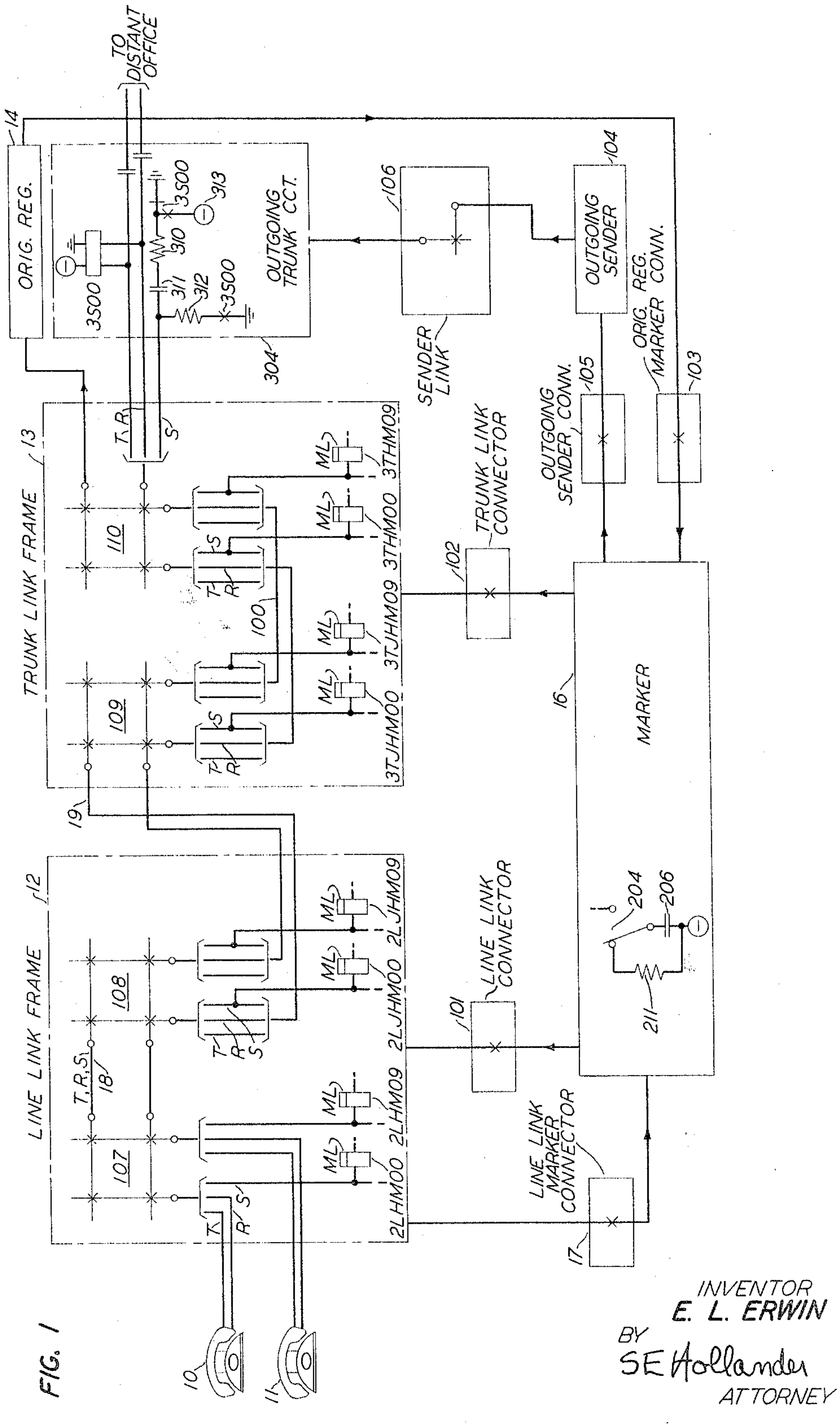
FIG. 1 illustrates an outline diagram of a No. 5 crossbar system in which the present invention may be incorporated.

Referring to FIG. 1, a block diagram of the major components in a typical No. 5 crossbar office is shown as an aid in understanding the present invention. For a comprehensive explanation of the operation of a No. 5 crossbar switching system, reference may be made to Patent 2,585,904 of A. J. Busch of February 19, 1952.

In FIG. 1, subscribers 10 and 11 which are representative of all of the subscribers connected to line link frame 12 are coupled to vertical paths on the crossbar line link frame. A trunk link frame 13 is a subsequent switching network at the outlets of which are connected trunk circuits and common equipment, such as originating register 14 and outgoing trunk 304 which extends to a distant office. The marker circuit 16 includes much of the necessary control equipment and logic for effecting the operation of the remaining equipment in the office.

A typical operation of the system shown in FIG. 1 is initiated when the subscriber, illustratively at substation 10, takes a receiver from the switchhook. A line relay, not shown, in operated which energizes line link frame 12 to in turn activate line link marker connector 17. The latter selects an idle marker, for example marker 16, and transmits to the marker the identity of calling substation 10.

Subsequently, the marker, as disclosed in detail in the above-referred-to patent, determines the equipment location of the calling line and selects an idle register for connection to the line. The equipment location of the calling line is stored in the selected idle originating register by the marker. Thereafter, the marker selects an idle channel between the substation line and the originating register. Thus, the channel may include the line link 18, junctor 19, and trunk link 100 to couple substation 10 to originating register 14. Having found the idle channel, the marker operates the select magnets (not shown in FIG. 1 but shown in detail in FIGS. 2 and 3) and hold magnets (e.g., 2LHM00, 2LJHM00, 3TJHM00 and 3TJHM09) to complete the connection. The facilities for operating the hold magnets is shown symbolically by manual switch 204 and capacitor 206 as explained in detail herein. Subsequently, the marker releases itself and the line link connector 101 and trunk link connector 102 over which it obtained access to the line link frame 12 and the trunk link frame 13. At this time originating register 14 returns dial tone to the calling subscriber. The subscriber at substation 10 may now dial the digits representative of the called directory number. When register 14 receives the complete called directory number, it in turn seizes an idle marker, for example marker 16, over originating register marker connector 103.

The register transmits to the marker the equipment location of the calling substation, the number of the line link frame used in the dialing connection (to originating register 14) and the called number.

The marker 16 in turn obtains access to an outgoing sender 104 through an outgoing sender connector 105 and also to an outgoing trunk 304 on an idle trunk link frame. The sender 104 is now coupled to the marker through the outgoing sender connector 105 and receives the called number from the marker. Moreover, a connection is established by the marker between the outgoing sender 104 and the outgoing trunk 304 over the sender link 106. When the trunk link frame 13 is seized, the marker connects to the line link frame 12 of calling substation 10 and establishes a channel between substation 10 and the outgoing trunk 304 in a manner similar to that described for the channel to originating register 14. The channel to trunk 304 may be the same as or different from the channel to register 14.

Thereafter, the marker 16 releases and the sender 104 transmits the called number to the distant office and subsequently disconnects itself and the sender link 106 whereupon outgoing trunk 304 maintains supervision of the call.

Thus, at the conclusion of the operation of the common control equipment, a number of hold magnets (e.g., 2LHM00 and 2LJHM00) remain operated in the line switch 107 of the line link frame and the line junctor switch 108 of the line link frame. Moreover, hold magnets (e.g., 3TJHM00 and 3THM00) also remain operated in the trunk junctor switch 109 as well as the trunk switch 110 of the trunk link frame 13. All of these hold magnets remain operated in parallel over a sleeve conductor or control conductor S which extends through the crosspoints of each stage. Traditionally, a ground is placed on the sleeve conductor of the channel by the trunk circuit and maintains all of the hold magnets operated. When the ground condition is removed, the current path through the hold magnets is broken and all of the hold magnets release, as described in the above-referred-to Busch patent, thereby disestablishing the connection.

However, since in the present invention the hold magnet cores are arranged to provide remanent magnetic fields in order to maintain the corresponding hold magnet armatures operated upon the removal of all current supply, the mere removal of the ground condition or interruption of the current path is ineffective since the hold magnets remain "magnetically latched" without any current supply. As will be seen in the following description of operation, it is essential to provide a release current in a direction which is opposite to that utilized for operating the hold magnet armatures in order to deflux the hold magnet cores and thereby permit the hold magnets to release and the connection to be discontinued. However, it must be recognized that the serial connection of all of the hold magnets in the switching train presents the threat that the release current which is driven in the opposite direction through all of the hold magnets will be interrupted by the release of any particular one of all of the hold magnets in the chain thereby interrupting current flow to the remaining hold magnets. In consequence, it is possible for the latter to remain magnetically latched in the operated condition. This difficulty is overcome in the present arrangement by the judicious application of a current pulse over sleeve conductor S through capacitor 311 to release the hold magnets wherein all of the hold magnet cores are defluxed prior to the release of the contacts of any one hold magnet.

The discharge of capacitor 311 is automatically effected in response to the release of supervisory relay 3S00 which in turn is controlled by a disconnect indication on the trunk circuit. The defluxing of all of the hold magnet cores over the sleeve conductor in response to relay 3S00 is more comprehensively treated in the following detailed description.

*Detailed description of operation*

Figure 2:
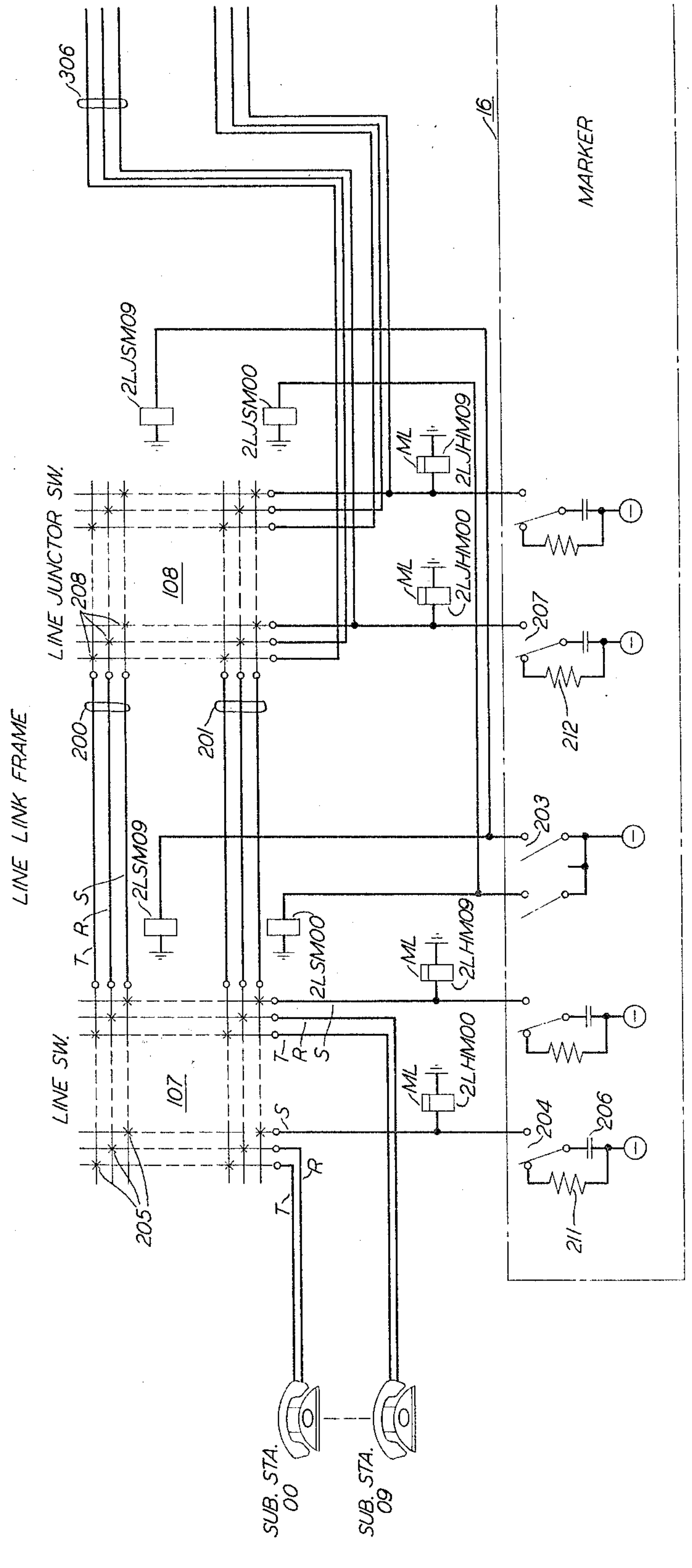
FIGS. 2 and 3 show the details of the connections to the hold magnets of the line link frame and trunk link frame of FIG. 1 in order to effect operation and release of the magnetically latching hold magnets.
Figures 3, 4:
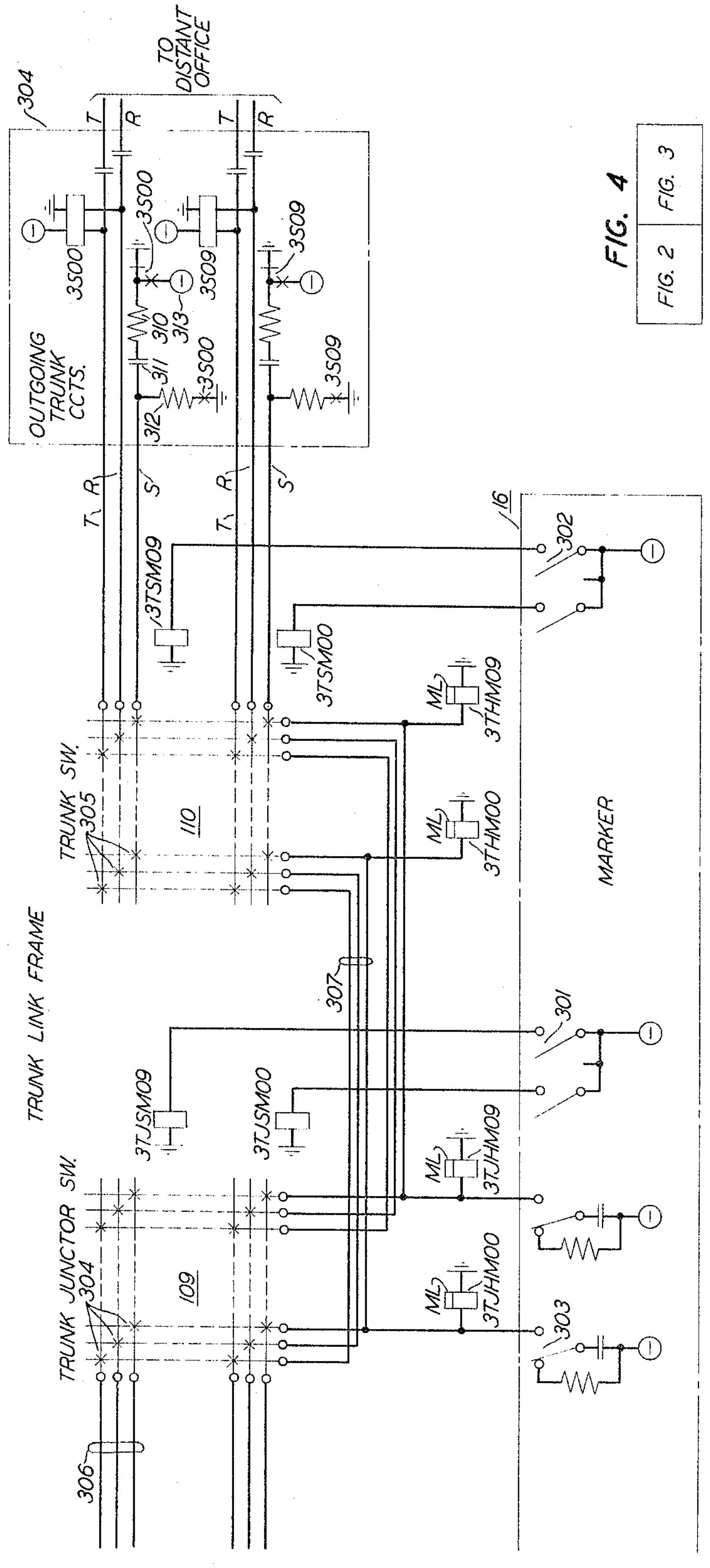
FIG. 4 shows the appropriate relationship of FIGS. 2 and 3 to disclose the invention.

Referring now to FIGS. 2 and 3, substations 00 and 09 are shown connected to the verticals of line switch 107. Line links 200 and 201 couple line switch 107 to line junctor switch 108. Individual hold magnets 2LHM00 and 2LHM09 are individual to substations 00 and 09. The select magnets 2LSM00 and 2LSM09 are individual to horizontal levels on the line switch.

Similarly, line junctor hold magnets 2LJHM00 and 2LJHM09 are individual to the vertical paths of the line junctor switch while select magnets 2LJSM00 and 2LJSM09 are individual to the horizontal levels of the line junctor switch.

With respect to the trunk link frame, the trunk junctor hold magnets 3TJHM00 and 3TJHM09 are individual to the vertical paths of the trunk junctor switch 109 while the trunk junctor select magnets 3TJSM00 and 3TJSM09 are individual to the horizontal paths thereof.

Moreover, the trunk hold magnets 3THM00 and 3THM09 are individual to the vertical paths of trunk switch 110 while trunk select magnets 3TSM00 and 3TSM09 are individual to the horizontal paths.

Although only two hold magnets and two select magnets are shown for each switch on both the line link frame and the trunk link frame, it is understood that a usual complement of crosspoints would require at least ten hold magnets and at least ten select magnets.

In a typical call to a distant office, as explained in the above general description, it is necessary for the marker circuit 16 to establish an idle channel between the vertical path unique to the calling substation and a trunk circuit extending to the distant office.

Assuming that substation 00 is initiating a call, the general operation described above with respect to FIG. 1 and explained comprehensively in the above-referred-to patent of A. J. Busch is followed and ultimately the marker 16 tests an idle path for continuity and closes the appropriate select and hold magnets to complete the path. In the assumed illustration, the marker circuit will initially operate line link select magnet 2LSM09 as shown symbolically by the operation of switch 203. Subsequently, hold magnet 2LHM00 is operated over switch 204 to close the vertical magnet unique to the calling substation and in turn to operate the crosspoints 205 in the line switch 107. It will be noted that condenser 206 is in series with switch 204 and that the current supplied to the line hold magnet is, therefore, of only a temporary nature determined by the battery voltage, the parameters of the capacitor 206 and the remaining impedance in the hold magnet operating circuit.

In a similar manner, the marker 16 closes additional select and hold magnets to complete the path as shown symbolically by the operation of the manual switches in the marker circuit. It will be noted that select magnet 2LJSM09 is operated in parallel with select magnet 2LSM09. Subsequently, the operation of hold magnet 2LJHM00 over switch 207 closes crosspoints 208 in the line junctor switch.

Similarly, select magnets 3TJSM09 and 3TSM09 are operated over switches 301 and 302 while hold magnets 3TJHM00 and 3THM00 are operated over switch 303. As a result, crosspoints 304 and 305 are closed.

At this time a complete path extends from substation 00 over the crosspoint contacts 205, line link 200, crosspoints 208, junctor 306, crosspoints 304, trunk link 307, crosspoints 305 to the trunk circuit 304 and the tip and ring conductors of the trunk extending to the central office. As indicated previously, none of the hold magnets has current supplied thereto except for the brief period during operation, in view of the condensers in series with the operating path. Nevertheless, these hold magnets all remain operated in consequence of the magnetic latching qualities of their cores. Moreover, as explained in the above-referred-to Busch patent, the select magnets are only momentarily operated prior to the operation of the hold magnets and are subsequently released. In consequence, the entire path traced above from substation 00 to the tip and ring conductors of the trunk extending to the distant office is maintained without further current supply in view of the magnetic latching qualities of each of the hold magnet cores.

The circuit may continue in this state until the conversation connection is terminated.

It will be noted that relay 3S00 is operated over the tip and ring conductors of the path described above and over the switchhook contacts (not shown) of substation 00 which afford a complete direct-current path through both windings of the relay from negative battery to ground. Relay 3S00 is, in consequence, a supervisory relay which will respond to an on-hook condition at substation 00 and the consequent opening of the switchhook contacts thereat to release its own contacts.

When the contacts of relay 3S00 are released in view of a disconnect condition at substation 00, a capacitor discharge current is driven through each of the hold magnets in a direction opposite to that utilized in operating the hold magnets. Thus, a path may be traced from ground, normally closed contacts of relay 3S00, resistance 310, capacitor 311, sleeve conductor S, crosspoint 305 to the winding of relay 3THM00. A similar path may be traced over the sleeve conductor of trunk link 307 to the winding of hold magnet 3TJHM00 and also over junctor 306 and crosspoints 304, 208 and 205 to hold magnets 2LJHM00 and 2LHM00. It will be noted that capacitor 311 was previously charged over the normally open contacts of relay 3S00 and resistances 312 and 310 to source 313.

It is desirable in delivering the release current to deflux each of these hold magnets to accomplish the appropriate defluxing prior to the release of any of the crosspoint contacts. The necessity for this procedure is apparent since if contacts 305, for example, are released, the current path over the sleeve conductor of trunk link 307 would be interrupted thereby cutting off release current to the remaining hold magnets and permitting those magnets to remain operated erroneously.

In the present arrangement, the parameters of condenser 311 and resistor 310 are arranged in a well-known manner to insure that each of the hold magnet cores is defluxed in a manner similar to that referred to in the above-identified article but prior to the release of any of the crosspoint contacts.

Thereafter, subsequent to the release current pulse and after the defluxing of all of the hold magnets, the crosspoint contacts release and may do so in random order without affecting the validity of the circuit release procedure.

As a typical illustration of the relationship between the defluxing time of the magnetic cores of the hold magnets and the physical contact release time of the crosspoints, it is illustratively possible to deflux the magnetic cores with an intensive high current pulse within a duration of ten to fifteen milliseconds. Since in conventional practice the release time of the crosspoints in the crossbar switch itself is usually a minimum of twenty-five milliseconds, an ample margin exists to insure that each of the hold magnets is defluxed prior to the movement of any crosspoint contacts.

In this manner the release current utilized for defluxing is driven through all of the hold magnet cores for the appropriate duration without threat of interruption.

The intensity and duration of release current should be limited to insure that the magnetic cores are merely defluxed and not driven to an opposite state of magnetization, and the design parameters for achieving this result may be achieved by well-known techniques not essential to an understanding of the present invention and explained, for example, in Patent 3,022,382 of J. C. Ewin of February 20, 1962.

Moreover, it will be noted that the switches 203, 204, etc., are operated only momentarily when energizing the respective hold magnets and returned to normal thereafter during which they are shunted by resistors 211, 212, etc.

It is to be understood that the above-described arrangements are illustrative of the application of the principles of the invention. Numerous other arrangements may be devised by those skilled in the art without departing from the spirit and scope of the invention.

What is claimed is:

1. A telephone crossbar switching system including a plurality of tandemly connected switching stages, each of said stages including a plurality of crosspoint contacts, normally defluxed magnetic actuating means for selectively operating said contacts and for magnetically latching said contacts in the operated condition, and means for delivering a release current to all of said magnetic means to deflux said magnetic means prior to the release of said contacts.

2. A telephone switching system including a plurality of switching stages, each of said stages including crosspoint contacts, magnetically latching means for operating said contacts in response to an operate current pulse and for maintaining said contacts operated after the cessation of said operating current pulse, and additional means for delivering a release current pulse to all of said magnetic means over a path including said crosspoint contacts to deflux said magnetic means prior to the release of said contacts.

3. A telephone switching system including a plurality of tandemly connectable switching stages, each of said stages including coordinate crosspoint arrays, magnetically retentive actuating means for operating a selected crosspoint contact in each of said stages in response to a pulse of current in a first direction and for maintaining said contact operated after said pulse subsides, junctor means and link means coupling said stages and responsive to the operation of said magnetically retentive means for establishing a speech path through said switching stages, and means for releasing said speech path including means for delivering a pulse of current to said magnetically retentive means in an opposite direction to deflux all of said magnetically retentive means prior to the release of any of said crosspoint contacts.

4. A telephone crossbar switching system including a plurality of crossbar switching stages, each of said stages including coordinate crosspoint arrays having crosspoint contacts, select magnet means and magnetically retentive hold magnet means for actuating particular crosspoint contacts in said arrays to establish a speech path, said hold magnet means being normally defluxed and operative in response to a current pulse in a particular direction to actuate said crosspoint contacts and to maintain said contacts operated after the subsidence of said current pulse for establishing a speech path through said arrays, and additional means for disestablishing said speech path including means for transmitting a current pulse to all of said hold magnet means prior to the release of any of said crosspoint contacts.

5. A telephone switching system including a plurality of tandemly connected crossbar switching stages, each of said stages including coordinate arrays having crosspoint contact sets at the crosspoints thereof, select magnet means and magnetically retentive hold magnet means for effecting the operation of a selected set of crosspoint contacts to establish a speech path through said stages, said hold magnet means being normally defluxed and responsive to a pulse of current in a first direction to actuate said set of crosspoint contacts and to maintain said contacts operated after the cessation of said pulse, and additional means for effecting the release of said switching path including means for delivering a pulse of release current in a second direction through said hold magnet means over a path including said operated crosspoint contacts to deflux all of said hold magnet means prior to the release of any of said crosspoint contacts.

6. A telephone crossbar switching system including a plurality of tandemly connectable switching stages, each of said stages including a coordinate switching array including horizontal and vertical conductive paths and crosspoint contacts at the intersections thereof, select magnet means and magnetically retentive hold magnet means for actuating a particular set of crosspoint contacts in said array, said hold magnet means being normally defluxed and operative in response to an operate pulse in a first direction to actuate said contacts and to maintain said contacts in the actuated condition after the cessation of said pulse, first capacitor means connectable in series with said hold magnet means for governing the duration of said operate current pulse, means responsive to the operation of particular crosspoint contacts in said arrays to complete a parallel speech path and control path therethrough, means for disestablishing said speech path and said control path including second capacitor means and means for delivering a pulse of release current in a second direction to all of said hold magnet means over said control path and said crosspoint contacts to deflux all of said hold magnet means prior to the release of any of said crosspoint contacts, said second capacitor means connected in series with said pulse delivering means to limit the duration of said pulse of current in said second direction.

7. A telephone crossbar switching system in accordance with claim 6 including in addition supervisory relay means coupled to said speech path to detect supervisory conditions on said path and responsive to a disconnect indication on said speech path to control the delivery of said pulse of current in said second direction through said second capacitor means.

8. A telephone crossbar switching system including a plurality of crossbar switching stages, each of said stages including coordinate arrays having vertical and horizontal conductive paths, crosspoint contacts at the intersection of said paths, select magnet means individual to said horizontal paths, magnetically hold magnet means individual to said vertical paths, said hold magnet means being normally defluxed and operative in response to a current pulse in a particular direction to actuate said crosspoint contacts and to maintain said contacts operated after the cessation of said current pulse, trunk circuit means, means for temporarily operating particular select magnets and for delivering a current pulse to particular hold magnets to operate selected crosspoint contacts to establish a speech path through said stages and a parallel control path through said stages to said trunk circuit means, and additional means in said trunk circuit means for releasing said speech path and control path including means for transmitting a current pulse in an opposite direction over said control path to all of said hold magnet means to deflux said hold magnet means before the release of any portion of said speech and control paths.

9. A telephone crossbar switching system in accordance with claim 8 wherein said means for delivering a current pulse to said hold magnet means includes a potential source; capacitor means; and switching means in series with said potential source and said capacitor means to deliver a momentary current pulse through said hold magnet means; and impedance means coupled to said potential source and to said switching means for discharging said capacitor means after the cessation of said current pulse.

10. A telephone crossbar switching system in accordance with claim 9 including a source of reference potential, and means for coupling said control path through said hold magnet means to said source of reference potential over the crosspoint contacts of adjacent stages in said switching system.

References Cited by the Examiner

UNITED STATES PATENTS

| | | | |
|---|---|---|---|
| 2,721,233 | 10/1955 | Johnson | 179—18.7 |
| 3,088,999 | 5/1963 | Brunberg et al. | 179—22 |
| 3,110,772 | 11/1963 | Hayward | 179—18.7 |
| 3,175,043 | 3/1965 | Jabczynski et al. | 179—22 |

KATHLEEN H. CLAFFY, *Primary Examiner.*

L. A. WRIGHT, *Assistant Examiner.*